(12) United States Patent
Sasaki et al.

(10) Patent No.: US 10,744,933 B2
(45) Date of Patent: Aug. 18, 2020

(54) DISPLAY DEVICE FOR VEHICLE

(71) Applicant: Toyota Jidosha Kabushiki Kaisha, Toyota-shi Aichi-ken (JP)

(72) Inventors: Akira Sasaki, Miyoshi (JP); Eisuke Ando, Nagoya (JP); Misako Hayashima, Okazaki (JP); Saki Kitoh, Okazaki (JP); Masahiro Yamashita, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/247,962

(22) Filed: Jan. 15, 2019

(65) Prior Publication Data

US 2019/0217773 A1 Jul. 18, 2019

(30) Foreign Application Priority Data

Jan. 17, 2018 (JP) .................. 2018-005818

(51) Int. Cl.
| | | |
|---|---|---|
| *B60K 35/00* | (2006.01) | |
| *B60Q 1/50* | (2006.01) | |
| *G09F 21/04* | (2006.01) | |
| *B60W 50/14* | (2020.01) | |
| *B60W 40/08* | (2012.01) | |

(52) U.S. Cl.
CPC .............. *B60Q 1/503* (2013.01); *B60K 35/00* (2013.01); *B60W 50/14* (2013.01); *G09F 21/048* (2013.01); *B60K 2370/1523* (2019.05); *B60K 2370/1526* (2019.05); *B60K 2370/1529* (2019.05); *B60K 2370/172* (2019.05); *B60K 2370/175* (2019.05); *B60K 2370/77* (2019.05); *B60K 2370/797* (2019.05); *B60W 2040/0881* (2013.01); *B60W 2050/146* (2013.01)

(58) Field of Classification Search
CPC B60Q 1/503; B60K 35/00; B60K 2370/1529; B60K 2370/797; B60K 2370/175; B60K 2370/1523; B60K 2370/1526; B60K 2370/17; B60K 2370/77; B60W 50/14; B60W 2050/146; G09F 21/048
See application file for complete search history.

(56) References Cited

U.S. PATENT DOCUMENTS

| | | | |
|---|---|---|---|
| 2005/0030184 A1* | 2/2005 | Victor | .................... B60K 28/06 340/576 |
| 2011/0137521 A1* | 6/2011 | Levi | ........................ B60N 2/002 701/36 |
| 2015/0032328 A1 | 1/2015 | Healey et al. | |
| 2017/0155867 A1* | 6/2017 | Yokota | .................... B60K 35/00 |

(Continued)

FOREIGN PATENT DOCUMENTS

| | | |
|---|---|---|
| JP | 2009145303 A | 7/2009 |
| JP | 2015505076 A | 2/2015 |
| JP | 2016220401 A | 12/2016 |

*Primary Examiner* — Munear T Akki
(74) *Attorney, Agent, or Firm* — Dinsmore & Shohl LLP (57) ABSTRACT

A display device for a vehicle includes a display portion that displays, toward at least one of an exterior or an interior of the vehicle, driving control information, the driving control information including at least one of first information, expressing how driving of the vehicle is being controlled, or second information, originating at the vehicle and being able to affect a traveling state of the vehicle.

3 Claims, 10 Drawing Sheets

(56) References Cited

U.S. PATENT DOCUMENTS

| | | | | |
|---|---|---|---|---|
| 2018/0173237 A1* | 6/2018 | Reiley | .................. | G05D 1/0214 |
| 2018/0264945 A1* | 9/2018 | Torii | ....................... | G02B 27/01 |
| 2018/0268701 A1* | 9/2018 | Sato | ....................... | B60Q 1/503 |
| 2018/0345790 A1* | 12/2018 | Mimura | ................ | B60W 50/16 |
| 2019/0210462 A1* | 7/2019 | Sasaki | ............... | B60W 60/0051 |

* cited by examiner

DISPLAY DEVICE FOR VEHICLE

CROSS-REFERENCE TO RELATED APPLICATION

This application is based on and claims priority under 35 USC 119 from Japanese Patent Application No. 2018-005818 filed on Jan. 17, 2018, the disclosure of which is incorporated by reference herein.

BACKGROUND

Technical Field

The present disclosure relates to a display device for a vehicle.

Related Art

Conventionally, there are cases in which images and/or character strings are displayed on a portion of a vehicle for decoration or the like. For example, Japanese Patent Application National Publication No. 2015-505076 discloses a personalized display for a vehicle that displays identifying information of a vehicle occupant or an advertisement or the like on display devices that can be seen from the exterior.

In the personalized display for a vehicle of Japanese Patent Application National Publication No. 2015-505076, information, that relates to the identification of a vehicle occupant and is detected by a vehicle sensor, is displayed on a display. However, it is difficult for such a display to contribute to the driving of the vehicle in which the display is installed or the driving of surrounding vehicles.

SUMMARY

The present disclosure provides a display device for a vehicle that can display information that is useful in traveling, for at least one of the driver who is onboard the vehicle and drivers who are onboard other vehicles.

A display device for a vehicle of a first aspect includes a display section that displays, toward at least one of an exterior or an interior of the vehicle, driving control information, the driving control information including at least one of (i) first information expressing how driving of the vehicle is being controlled, or (ii) second information originating at the vehicle and being able to affect a traveling state of the vehicle.

In the display device for a vehicle of the first aspect, driving control information of the vehicle is displayed by the display section toward at least one of the exterior and the interior of the vehicle. As an example, in a case in which the vehicle is being controlled by self-driving, that fact is displayed toward the exterior of the vehicle. Further, as another example, at the time when a vehicle that is being controlled so as to be self-driven changes course, that fact is displayed toward the exterior of the vehicle. Moreover, as another example, while a vehicle is decelerating, that fact is displayed toward the exterior of the vehicle. Due thereto, the driving of drivers who are onboard other vehicles can be aided. As yet another example, in a case in which a vehicle is being driven manually, information that has the possibility of affecting the traveling state of the vehicle, such as the effectiveness of the accelerator or the brakes or the weight of the steering wheel or the like, is displayed toward the interior of the vehicle. Due thereto, driving of the driver who is onboard the vehicle can be aided.

A second aspect of the present disclosure is a display device for a vehicle of the first aspect that further includes: a vehicle occupant information acquiring section that acquires vehicle occupant information of the vehicle; and an environment information acquiring section that acquires environment information of a periphery of the vehicle, wherein the display section displays at least one of the vehicle occupant information or the environment information.

In the display device for a vehicle of the second aspect, vehicle occupant information that is acquired by the vehicle occupant information acquiring section is displayed toward at least one of the exterior and the interior of the vehicle. As an example, at the time of manual driving, the driving history, the proficiency level, the domicile, or the like of the vehicle driver is displayed toward the exterior of the vehicle as vehicle occupant information. Due thereto, drivers who are onboard other vehicles can be alerted. Further, as another example, the driving frequency and biometric information such as the physical condition or the like of the driver are displayed toward the interior of the vehicle as vehicle occupant information. Due thereto, the driver who is onboard the vehicle is alerted.

Further, at the display device for a vehicle, environment information that is acquired by the environment information acquiring section is displayed toward at least one of the exterior and the interior of the vehicle. As an example, the distance between vehicles is displayed toward the interior of the vehicle as the environment information. Due thereto, at the time of self-driving, a vehicle occupant who is onboard the vehicle can be made to feel secure. Or, at the time of manual driving, the driver who is onboard the vehicle can be alerted. Further, as another example, when, at the time of self-driving, an obstacle is recognized as the environment information, that fact is displayed toward the exterior of the vehicle. Due thereto, pedestrians at the periphery and drivers onboard other vehicles can be made to feel secure.

A third aspect of the present disclosure is a display device for a vehicle of the second aspect that further includes a selecting section that selects information having a high degree of importance from among the driving control information, the vehicle occupant information and the environment information, wherein the display section displays the selected information.

In the display device for a vehicle of the third aspect, information having a high degree of importance is selected by the selecting section from among the driving control information, the vehicle occupant information and the environment information. For example, in a case in which traffic jam information is acquired as the environment information, and information that the driver is feeling sleepy is acquired as the vehicle occupant information, the information that the driver is feeling sleepy is judged to have a high degree of importance, and the display section is made to display appropriate information. Due thereto, a vehicle occupant who is onboard the vehicle can be alerted appropriately.

A fourth aspect of the present disclosure is a display device for a vehicle of the third aspect, wherein the selecting section judges information, which is new among the driving control information, the vehicle occupant information and the environment information, to be information having a high degree of importance.

In the display device for a vehicle of the fourth aspect, the selecting section judges that new information has a high degree of importance. For example, among road construction information, information of a traffic jam due to the construction, and information of art accident that is due to the traffic jam which are environment information, the traffic jam information is newer than the construction information, and the accident information is newer than the traffic jam information. Therefore, the selecting section judges that the degree of importance of the traffic jam information is higher than that of the construction information, and that the degree of importance of the accident information is higher than that of the traffic jam information. By judging that new information has a high degree of importance in this way, urgent information can be displayed appropriately.

In accordance with the display device for a vehicle relating to the present disclosure, information that is useful in traveling can be displayed for at least one of the driver who is onboard the vehicle and drivers who are onboard other vehicles.

BRIEF DESCRIPTION OF THE DRAWINGS

Exemplary embodiments of the present disclosure will be described in detail based on the following figures, wherein.

DETAILED DESCRIPTION

Display Device for Vehicle

A vehicle display device 20 relating to an embodiment of the present disclosure is a display device for conveying information that is for displaying, toward the exterior of the vehicle, that, for example, the vehicle that is being controlled so as to be self-driven is in the midst of being self-driven. Further, the vehicle display device 20 can also display, toward the exterior of the vehicle, the driving proficiency level of the driver who is manually driving the vehicle, and can also display accident information toward the interior of the vehicle.

Figure 1:
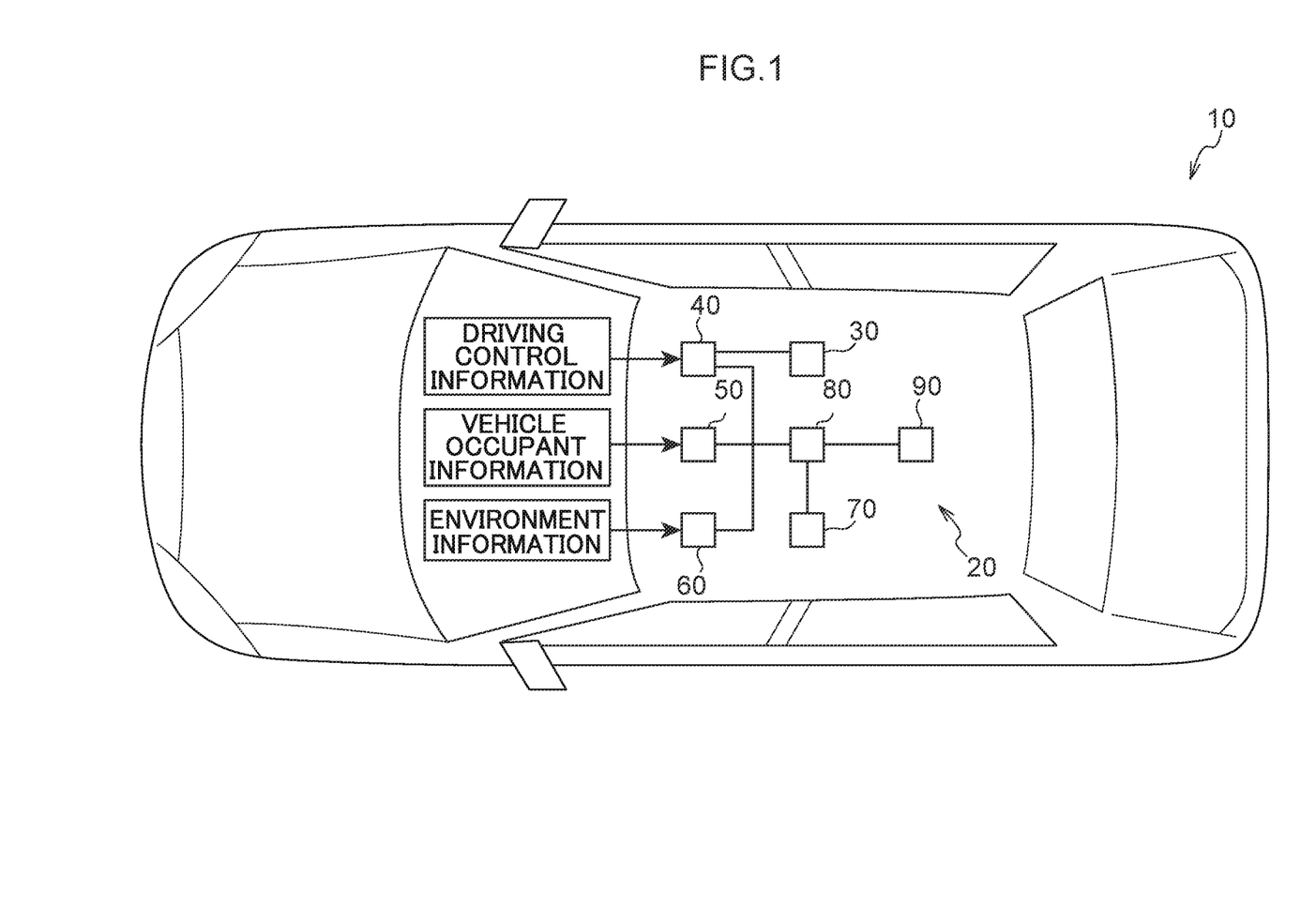
FIG. 1 is a plan view showing an overview of a vehicle in which a display device for a vehicle relating to an embodiment of the present disclosure is installed.

As shown in FIG. 1, the vehicle display device 20 relating to the embodiment of the present disclosure has driving setting section 30, driving control information acquiring section 40, vehicle occupant information acquiring section 50, environment information acquiring section 60, communicating section 70, a control device 80, and display section 90. Hereinafter, first, the structures and functions of these respective units that structure the vehicle display device 20 will be described respectively, and then an example of a method for displaying information at the time of traveling of a vehicle 10, in which the vehicle display device 20 is installed, will be described by using a flowchart.

Figure 8:
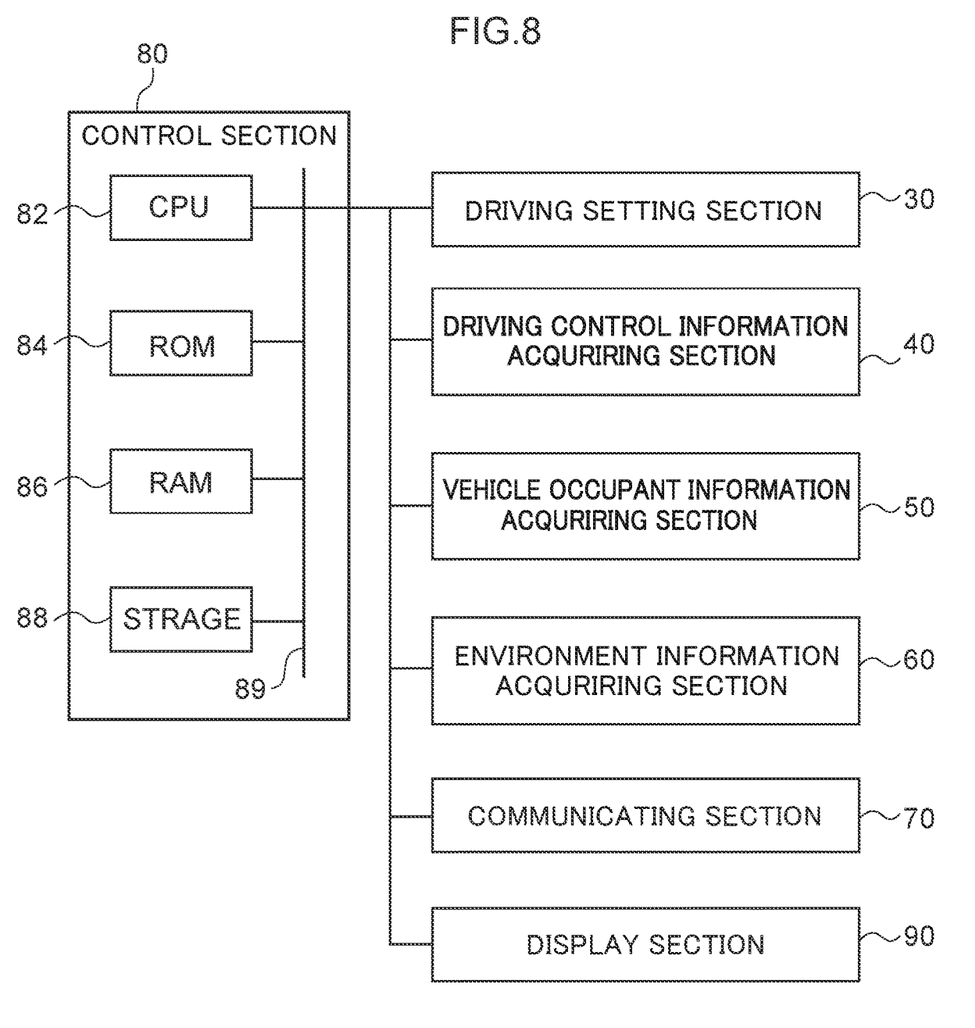
FIG. 8 is a block diagram illustrating hardware configuration of the display device for a vehicle.

As shown in FIG. 8, the control device 80 includes a Central Processing Unit (CPU) 82, Read Only Memory (ROM) 84, Random Access Memory (RAM) 86, and storage 88. These configurations of the control device 80 are connected through a bus 89 to the driving setting section 30, the driving control information acquiring section 40, the vehicle occupant information acquiring section 50, the environment information acquiring section 60, the communicating section 70, and the display section 90 so as to communicate each other.

The CPU 82 is a central computation processing unit that executes various programs and controls various sections. Namely, the CPU 82 reads programs from the ROM 84 or the storage 88, and executes the programs using the RAM 86 as a workspace. The CPU 82 controls the various configurations and performs various computation processing according to the programs recorded in the ROM 84 or the storage 88. In the present exemplary embodiment, the ROM 84 or the storage 88 stores (i) an information acquisition program to acquire an information by the driving setting section 30, the driving control information acquiring section 40, the vehicle occupant information acquiring section 50, the environment information acquiring section 60, and the communicating section 70, and (ii) a deciding program to decide which information is to be displayed by the display section 90 and is to be conveyed by the communicating section 70, (iii) an information display program to display the information which is decided to display, and (iv) a conveying program to convey the information which is decided to convey.

The ROM 84 stores various programs and various data. The RAM 86 serves as a workspace that temporarily retains programs and data. The storage 88 is configured by a Hard Disk Drive (HDD) or a Solid State Drive (SSD), and stores various programs, including an operating system, and various data.

(Display Section)

The display section 90 is display devices that display, toward the exterior or the interior of the vehicle 10, driving control information, vehicle occupant information, and environment information that are described later. Processing of the display section 90 is implemented by the CPU 82 that reads and executes the information display program retained in the ROM 84 or the storage 88. The display section 90 receives electric signals from the control device 80, and displays, on display portions, images, videos, characters, graphics, colors, combinations of these, and the like.

Figure 2A:
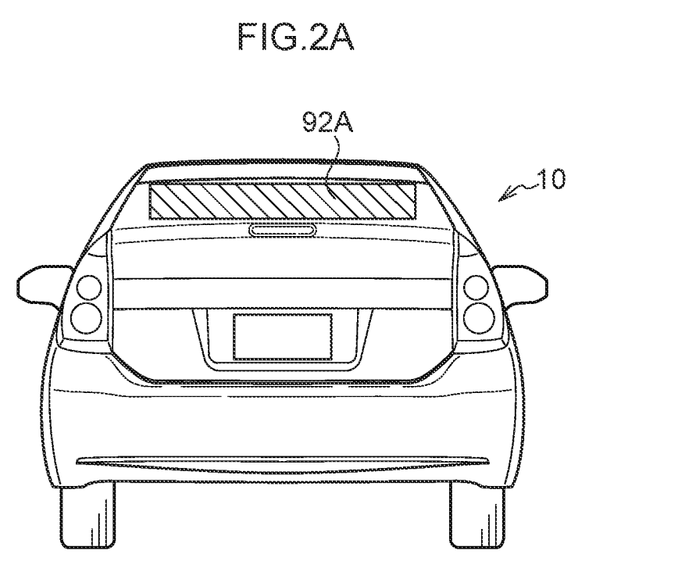
FIG. 2A is a vehicle rear view showing an example of the position of a display portion that is formed at a rear window, at the display device for a vehicle relating to the embodiment of the present disclosure.

A display portion 92A that is shown in FIG. 2A is a display that is formed at the rear window of the vehicle 10. The display portion 92A is a display that displays information toward vehicles behind the vehicle 10, or pedestrians walking on sidewalks, or the like.

Figure 2B:
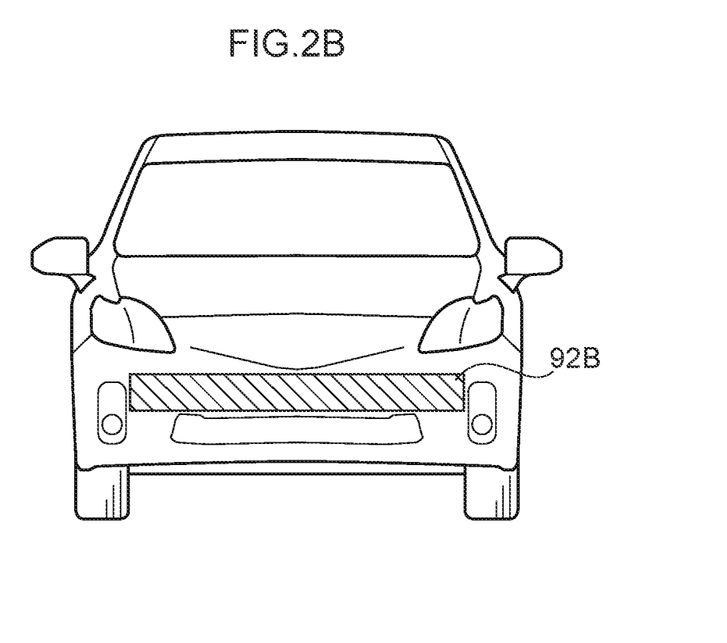
FIG. 2B is a vehicle front view showing an example of the position of a display portion that is formed at a front bumper, at the display device for a vehicle relating to the embodiment of the present disclosure.

A display portion 92B that is shown in FIG. 2B is a display that is formed at the front bumper of the vehicle 10. The display portion 92B is a display that displays information toward vehicles traveling in front of the vehicle 10, or pedestrians walking on sidewalks, or the like.

Figure 2C:
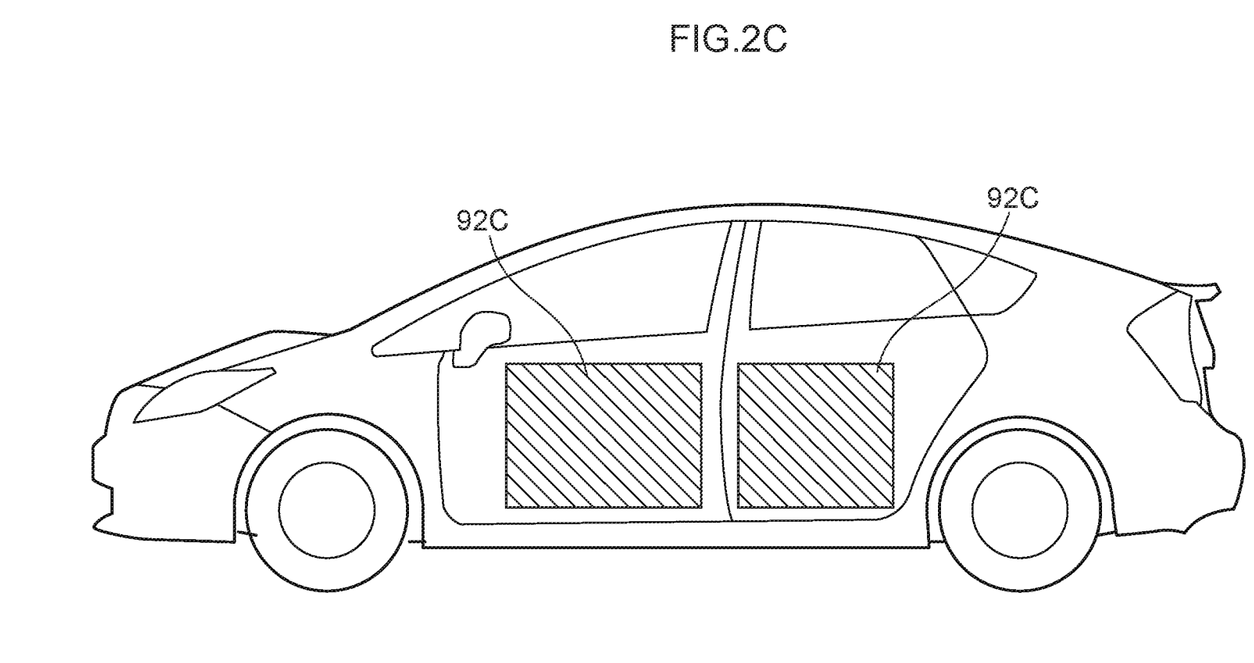
FIG. 2C is a vehicle side view showing an example of positions of display portions that are formed at a front door and a rear door, at the display device for a vehicle relating to the embodiment of the present disclosure.

Display portions 92C that are shown in FIG. 2C are displays that are formed at a front door and a rear door of the vehicle 10. The display portions 92C are displays that display information toward pedestrians walking on sidewalks, or the like.

Figure 3:
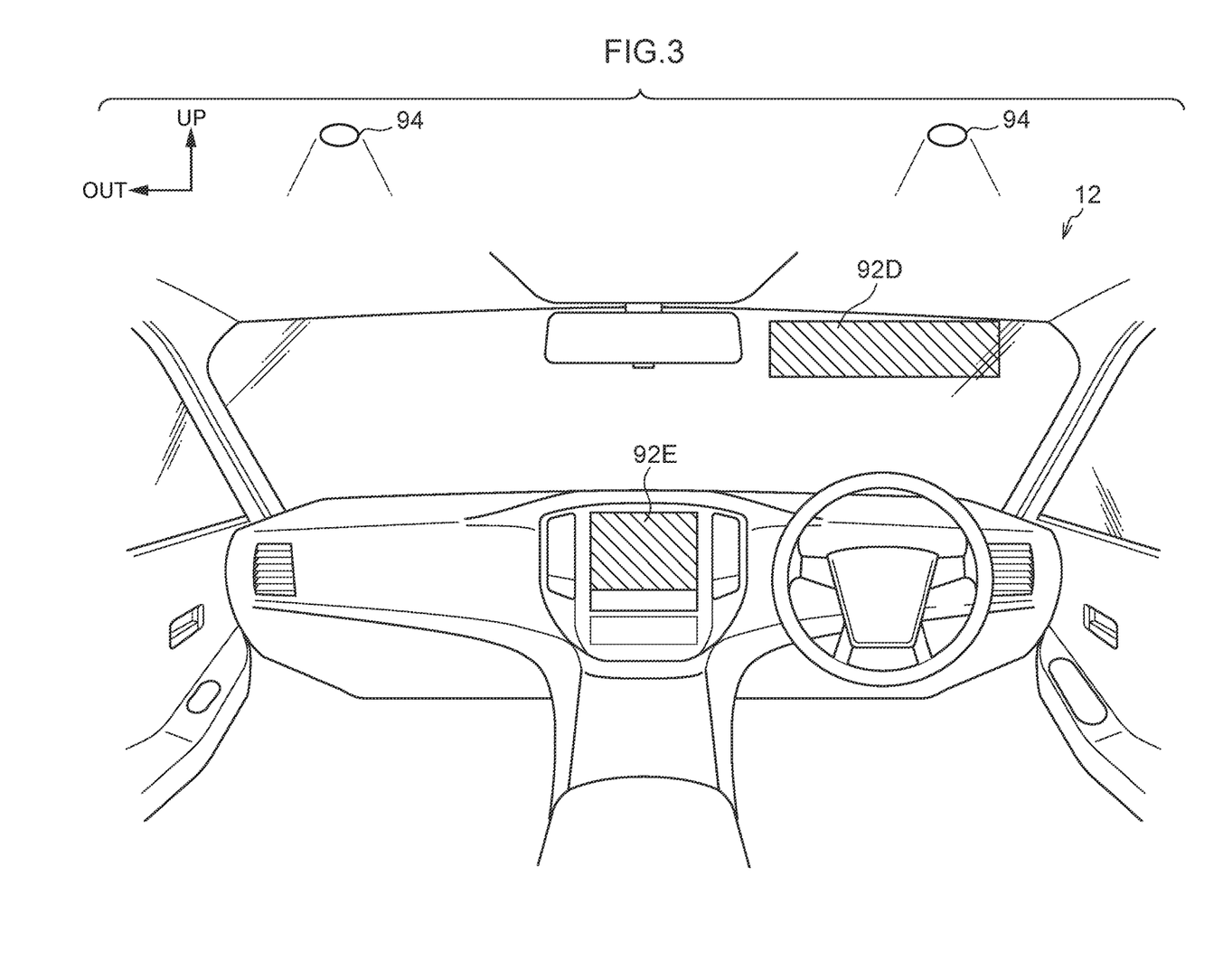
FIG. 3 is a perspective view showing an example of positions of display portions that are formed at the front window and an instrument panel, at the display device for a vehicle relating to the embodiment of the present disclosure.

Moreover, a display portion 92D that is shown in FIG. 3 is a display that is formed at the front window of the vehicle 10. The display portion 92E is a display that is formed at the instrument panel. The display portions 92D, 92E are displays that display information toward vehicle occupants who are at the interior of the vehicle 10.

These displays may be liquid crystal screens or organic EL displays that are retractable or are always exposed, or may be the projections of images or the like onto display surfaces by using unillustrated projectors (head-up displays or the like). Or, an electrically conductive layer may be provided within the glass that forms the rear window or the front window, and images and the like may be displayed at the electrically conductive layer.

In addition to the display portions 92 (the display portions 92A through 92E are collectively called the display portions 92), the vehicle display device 20 has an illuminating device 94 as the display section 90. The illuminating device 94 is structured to include an LED light source, and a control device that can continuously adjust the hue and light intensity of the LED light source and the turning on and off thereof.

(Driving Setting Section)

The driving setting section 30 shown in FIG. 1 is a driving switching device by which a vehicle occupant who is sitting in the driver's seat of the vehicle 10 switches between a self-driving mode and a manual driving mode of the vehicle. For example, a switch button that is set at the instrument panel of the vehicle interior can be used as the driving setting section 30. Or, a voice recognition device that recognizes the voice of a vehicle occupant, or the like, can also be used.

The driving mode (either the self-driving mode or the manual driving mode) that is set by the driving setting section 30 is conveyed to the driving control information acquiring section 40 by electric signals.

(Driving Control Information Acquiring Section)

The driving control information acquiring section 40 is an information collecting device that collects driving control information of the vehicle 10. Processing of the information acquiring section 40 is implemented by the CPU 82 that reads and executes the information acquisition program retained in the ROM 84 or the storage 88. Further, the driving control information acquiring section 40 conveys the collected driving control information to the control device 80 by electric signals.

"Driving control information" is information that expresses the state of control of the driving of the vehicle, and includes "driving mode" and "instruction information" as information expressing how driving of the vehicle 10 is being controlled, and "state information" as information that may affect the traveling state of the vehicle 10.

As described above, the "driving mode" is information expressing which of the self-driving mode and the manual driving mode is the mode in which driving of the vehicle 10 is being controlled. "Instruction information" is information expressing how driving of the vehicle 10 is being controlled in accordance with instructions of the vehicle occupant or the self-driving control equipment, such as the travelling speed, acceleration, on/off states of the headlights, absence/presence and direction of direction indication by the turn signals, and the like. "State information" is information (information originating from the vehicle 10) that may affect the traveling state of the vehicle 10 such as the states of wear of the tires or the brake pads, or the like. This state information is information relating to the states of various types of parts that physically change in accordance with the driving history. State information is used as an index that, for example, shows the driver the responsiveness of the brakes.

Figure 4A:
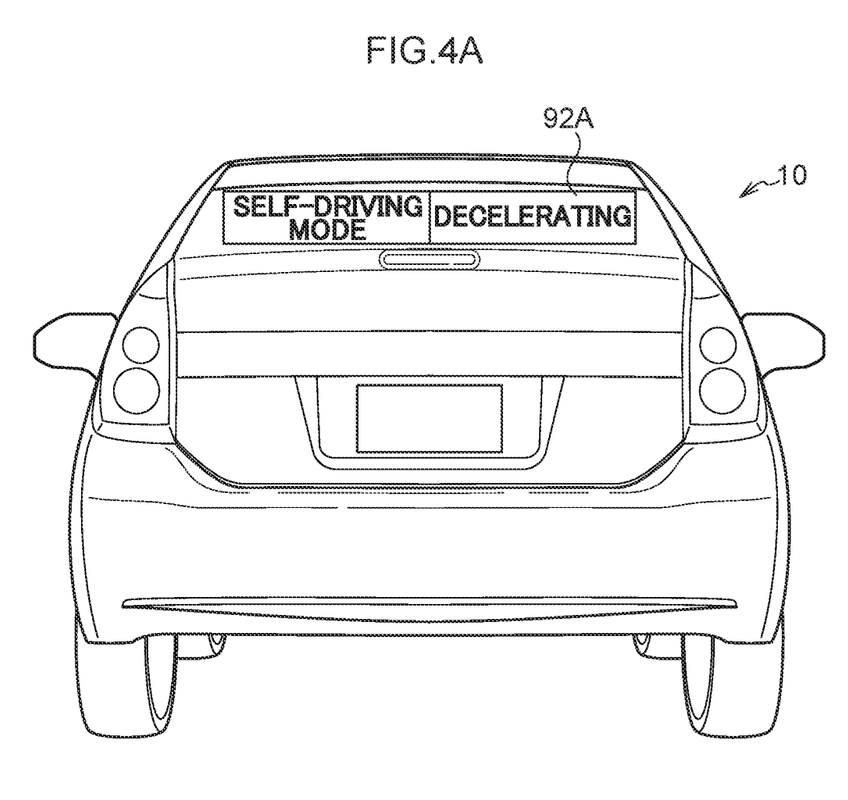
FIG. 4A is a vehicle rear view showing an example of information displayed at the display portion of the rear window, at the display device for a vehicle relating to the embodiment of the present disclosure.

The driving control information is conveyed to the control device 80, and thereafter, the necessity of displaying the information is decided upon by the control device 80, and information is displayed by the display section 90. For example, as shown in FIG. 4A, "self-driving mode" is displayed as the driving mode and "decelerating" is displayed as instruction information, on the display portion 92A. Vehicles traveling behind can thereby be alerted. Note that the form of expression of the display is not limited to words, and symbols and colors and the like can be combined.

(Vehicle Occupant Information Acquiring Section)

The vehicle occupant information acquiring section 50 collectively refers to the information acquiring devices that are for obtaining information relating to the vehicle occupants. Processing of the vehicle occupant information acquiring section 50 is implemented by the CPU 82 that reads and executes the information acquisition program retained in the ROM 84 or the storage 88. The vehicle occupant information acquiring section 50 conveys the acquired vehicle occupant information to the control device 80 by electric signals.

"Vehicle occupant information" is information expressing the attributes and states of the driver and the vehicle occupants other than the driver, and includes "driving history", "geographical information", and "biometric information".

"Driving history" is an index that quantitatively expresses the proficiency level of the driver relating to driving, such as the total distance driven, the driving frequency, the types of vehicles driven, and the like that the vehicle occupant who is seated in the driver's seat (the driver) has driven from the time of acquiring his/her license to the present. "Geographical information" is information such as the domicile of the driver, the frequency of the driver driving the area currently being traveled, and the like. The control device 80 judges the driver's familiarity with the locality on the basis of this geographical information.

The driving history and geographical information are recorded on an identification tag such as an ID card or a chip or the like that the driver carries, and are updated at any time. The vehicle occupant information acquiring section 50 is equipped with a reading terminal, and this reading terminal reads-out the information recorded on the identification tag and acquires the driving history. Note that the driving history and geographical information may be stored in the ROM 84 or the storage 88 that is installed in the vehicle 10, and may be updated at any time.

"Biometric information" is information such as the age, body temperature, heart rate, eye movement, and the like of the vehicle occupant. On the basis of this biometric information, the control device 80 judges the physical condition, state of tension, sleepiness, state of sleeping not sleeping, and the like of the vehicle occupant.

In addition to being read-out from the identification tag by using the aforementioned reading terminal, the biometric information can be read-out by using thermocouples that are embedded in the seat in which the vehicle occupant sits, infrared sensors, eye tracking devices, various types of sensors that are attached to the wrists and the throat of the vehicle occupant, and the like.

Figure 4B:
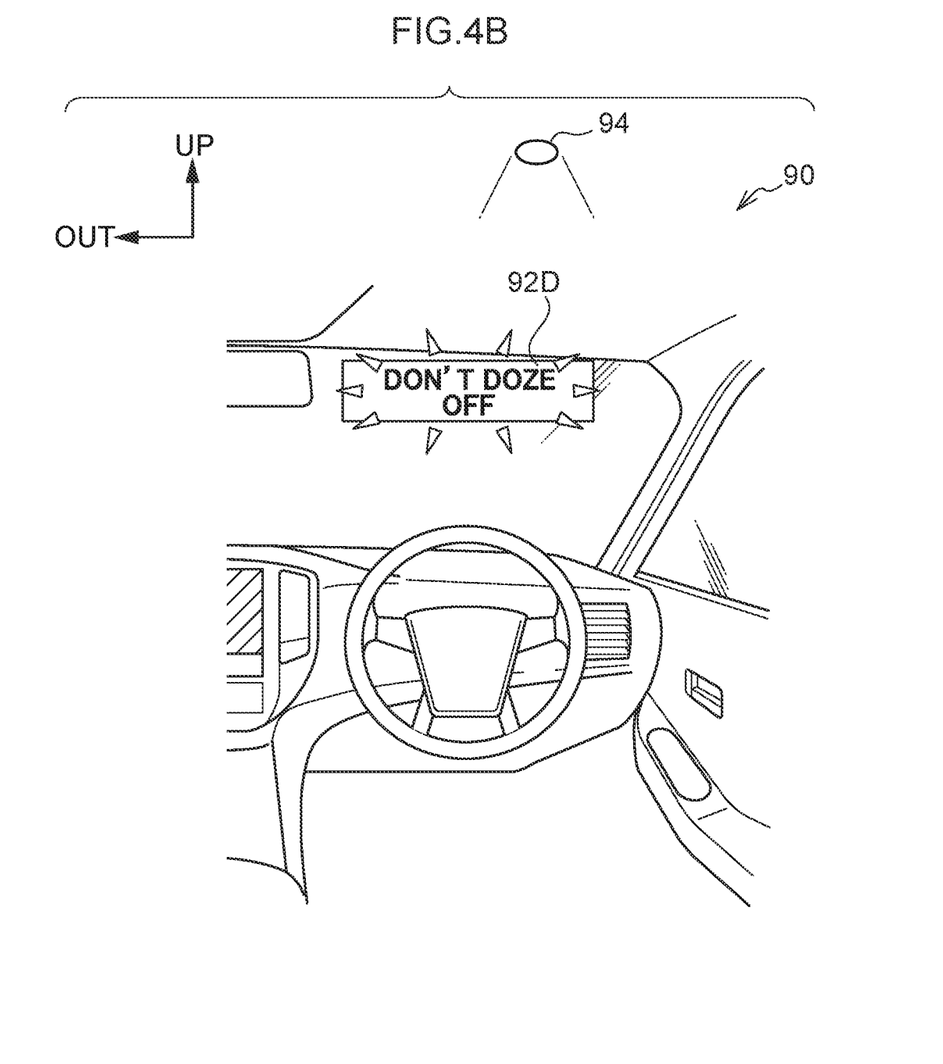
FIG. 4B is a perspective view showing an example of information displayed at the display portion of the front window, at the display device for a vehicle relating to the embodiment of the present disclosure.

After these vehicle occupant information are conveyed to the control device 80, the necessity of displaying the information is decided upon by the control device 80, and the information is displayed by the display section 90. For example, as shown in FIG. 4B, the words "Don't doze off" are displayed on the display portion 92D as biometric information. The driver can be alerted by these words being made to flash on-and-off. Further, the driver can be alerted due to the ambient color of the interior of the vehicle 10 being changed by the illuminating device 94.

Examples of the biometric information that is conveyed to the control device 80 are the body temperature, vibrations of the sightline, and the like of the driver. In a case in which the control device 80 judges these information collectively and judges that the driver is feeling sleepy, the control device 80 can make the appropriate information be displayed on the display portion 92. In this way, the information that is displayed on the display portion 92 is not only information that is directly conveyed from the vehicle occupant information acquiring section 50 or the like, and also includes inferred information (e.g., "the driver is feeling sleepy") that is judged by the control device 80 from the information that has been directly conveyed. Further, the information that is displayed on the display portion 92 includes conversion information (e.g., "Don't doze off") that converts this inferred information into words that alert.

(Environment Information Acquiring Section)

The environment information acquiring section 60 is a collective term for information acquiring devices that are for grasping the situation of the surrounding environment of the vehicle 10. Processing of the environment information acquiring section 60 is implemented by the CPU 82 that reads and executes the information acquisition program retained in the ROM 84 or the storage 88. The environment information acquiring section 60 conveys the acquired environment information to the control device 80 as electric signals.

"Environment information" information of the exterior of the vehicle 10. "Positional information of fixed objects" that are fixed to the ground, such as roads, buildings, guardrails and the like that exist at the periphery of the vehicle 10, is included as environment information. Further, "positional information of objects that move" such as peripheral vehicles, bicycles, pedestrians, animals, falling objects, and the like, and "velocity information" and "acceleration information" are also included as "environment information".

The positional information, velocity information and acceleration information can be acquired by using cameras that are set so as to face the exterior of the vehicle 10, and acceleration sensors, infrared sensors and the like.

Further, "long distance information" of places that are far from the vehicle 10 and which is difficult to obtain from a vicinity of the vehicle 10, such as traffic jam information of the roads, accident information, and the like is included as the environment information. The long distance information can be acquired by using the communicating section that is described hereafter.

(Communicating Section)

The communicating section 70 functions as the driving control information acquiring section 40, the vehicle occupant information acquiring section 50, and the environment information acquiring section 60. The communicating section 70 is an information transfer device that receives the driving control information, the vehicle occupant information, and the environment information from the exterior of the vehicle by wireless communication, and transmits information to the exterior of the vehicle. Processing of the communicating section 70 is implemented by the CPU 82 that reads and executes the information acquisition program and the conveying program retained in the ROM 84 or the storage 88.

In addition to being able to be stored in the ROM 84 or the storage 88, the state information of the above-described driving control information can be stored in an internet server and updated at all times by using the communicating section 70. Further, the driving history and geographical information of the above-described vehicle occupant information also can be stored in an internet server and updated at all times by using the communicating section 70.

Still further, the long distance information of the environment information can be obtained by communication with internet servers or surrounding vehicles, by using the communicating section 70. When long distance information is obtained from an internet server, the communicating section 70 receives information that has been uploaded onto the internet server.

Figure 5:
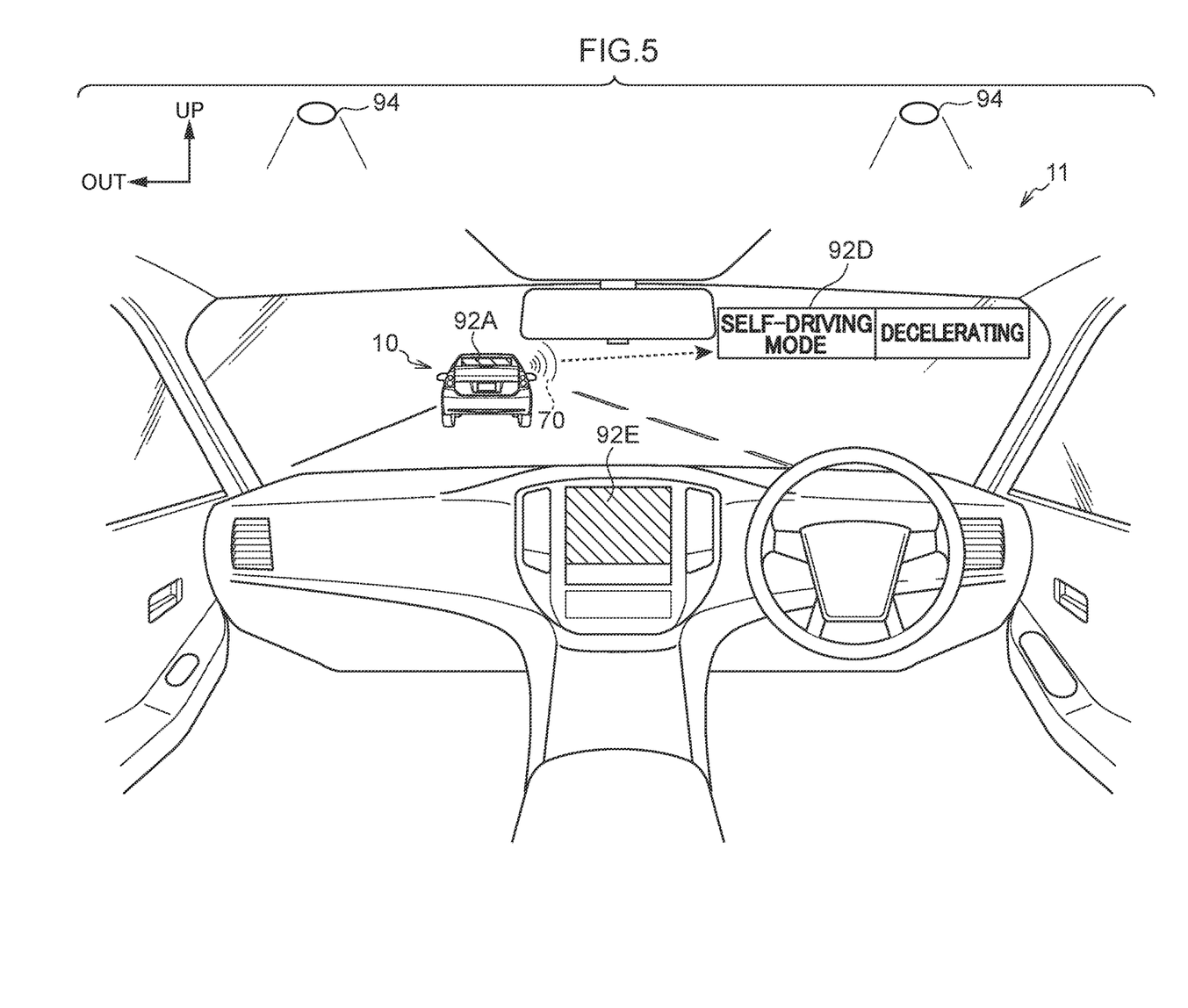
FIG. 5 is a perspective view showing a state in which a communicating section at the display device for a vehicle relating to the embodiment of the present disclosure is transmitting information to a vehicle therebehind.

The communicating section 70 can transmit the position information, velocity information and acceleration information of the environment information, the driving control information and the vehicle occupant information, to the exterior of the vehicle. For example, as shown in FIG. 5, information that is being displayed in the rear window of the vehicle 10 can be transmitted to vehicles behind the vehicle 10, and can be displayed at the display portion 92D of the front window or the display portion 92E of the instrument panel of a following vehicle 11. Due thereto, necessary information can be conveyed to vehicles behind the vehicle 10 even in cases in which the displayed information is difficult to see from the interiors of the vehicles behind, for example, when sunlight is shining directly onto the rear window of the vehicle 10, or at times of heavy rain or the like, or the like.

(Control Device)

The control device 80, which serves as an example of the selecting section in the present disclosure, is a control device that decides upon the contents to be displayed by the display section 90, on the basis of information (the driving control information, the vehicle occupant information, the environment information) that has been conveyed from the driving control information acquiring section 40, the vehicle occupant information acquiring section 50, the environment information acquiring section 60 and the communicating section 70. Processing of the control device 80 is implemented by the CPU 82 that reads and executes the information acquisition program and the deciding program retained in the ROM 84 or the storage 88. Note that, in the following description, there are cases in which the driving control information acquiring section 40, the vehicle occupant information acquiring section 50, the environment information acquiring section 60 and the communicating section 70 are collectively called information acquiring equipment.

The control device 80 selects information of a high degree of importance from among the information that are conveyed from the information acquiring equipment, and causes the display section 90 to display information having a high degree of importance. For example, in a case in which traffic jam information is acquired as the environment information, and information that the driver is feeling sleepy is acquired as the vehicle occupant information, the control device 80 judges that the degree of importance of the information that the driver is feeling sleepy is high and causes the display section to display appropriate information. Due thereto, a vehicle occupant can be alerted.

Figure 6A:
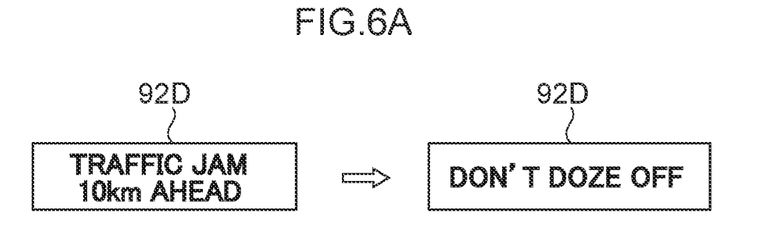
FIG. 6A is a front view showing an example of switching display from information having a relatively low degree of importance to information having a relatively high degree of importance, at the display portion of the display device for a vehicle relating to the embodiment of the present disclosure.
Figure 6B:
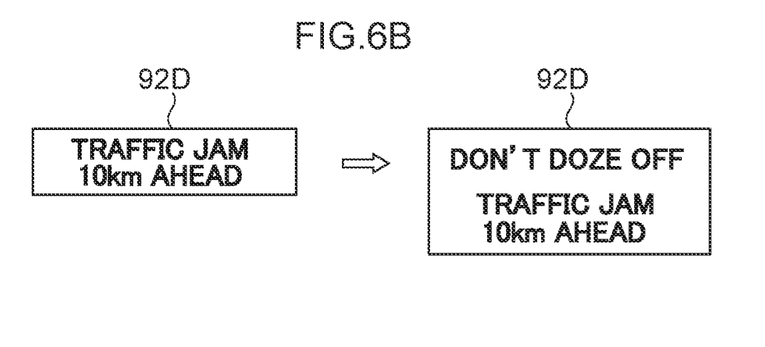
FIG. 6B is a front view showing an example of displaying information having a relatively high degree of importance above information having a relatively low degree of importance, at the display portion of the display device for a vehicle relating to the embodiment of the present disclosure.
Figure 6C:
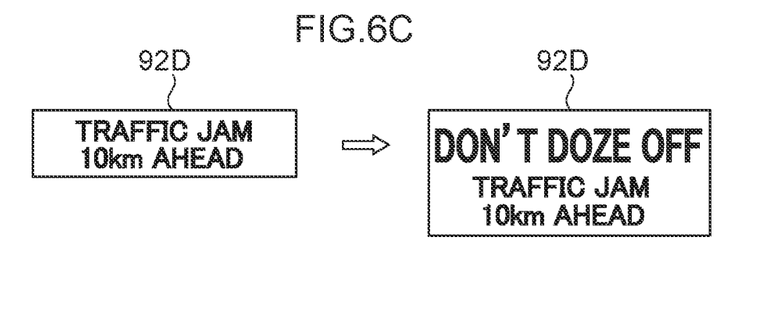
FIG. 6C is a front view showing an example of displaying information having a relatively high degree of importance more largely than information having a relatively low degree of importance, at the display portion of the display device for a vehicle relating to the embodiment of the present disclosure.

Note that, as a display method that reflects the degree of importance, as shown in FIG. 6A, there is a method in which the display of information that has a relatively low degree of importance (e.g., "traffic jam 10 km ahead") is turned-off and information that has a relatively high degree of importance (e.g., "don't doze off") is displayed. Or, as shown in FIG. 6B, there is a method in which the display region of the display portion 92D is enlarged, and the information having a relatively high degree of importance is displayed above the information having a relatively low degree of importance. Or, as shown in FIG. 6C, there is a method in which the information that has a relatively high degree of importance is displayed larger than the information having a relatively low degree of importance.

Further, the control device 80 judges the degrees of importance of other information in accordance with the contents of the information conveyed from the information acquiring equipment.

As an example, a case will be described in which information, which is that the driver has been driving a vehicle of a different vehicle type (hereinafter, vehicle A) over a long period of time, is conveyed from the vehicle occupant information acquiring section 50 as vehicle occupant information. In this case, at the vehicle 10, the control device 80 judges that portions that differ greatly from vehicle A (e.g., the effectiveness of the brakes, the speed of acceleration) are driving control information that have high degrees of importance. Then, the display section 90 displays the selected information toward the interior of the vehicle 10 (e.g., on the display portion 92D). Due thereto, the driver can adjust the force of depressing the accelerator or the brake pedal.

Further, as another example, a case is described in which the tact that the vehicle 10 is in the self-driving mode is conveyed from the driving control information acquiring section 40. In this case, the control device 80 selects the fact that the vehicle 10 is being controlled by self-driving as information having a high degree of importance. Then, the display section 90 displays the selected information toward the exterior of the vehicle (e.g., on the display portion 92A).

As still another example, a case is described in which the fact that the vehicle 10 is in the manual driving mode is conveyed from the driving control information acquiring section 40. In this case, the control device 80 selects, from among the vehicle occupant information and as information having a high degree of importance, the driving history, the proficiency level, the domicile, or the like. Then, the display section 90 displays the selected information toward the exterior of the vehicle (e.g., on the display portion 92A).

Further, there are cases in which the control device 80 judges that new information among the driving control information, the vehicle occupant information and the environment information, has a high degree of importance.

For example, among road construction information, information of a traffic jam due to the construction, and information of an accident that is due to the traffic jam which are environment information, the traffic jam information is more recent than the construction information, and the accident information is more recent than the traffic jam information. Therefore, the selecting section judges that the degree of importance of the traffic jam information is higher than that of the construction information, and that the degree of importance of the accident information is higher than that of the traffic jam information. By judging that new information has a high degree of importance in this way, urgent information can be displayed appropriately.

By judging the degrees of importance by combining plural information in this way, the display section can be made to display appropriate information.

Note that various methods can be employed as the method by which the control device 80 selects information of a high degree of importance. For example, information that may be conveyed from the information acquiring equipment, and scored degrees of importance of the respective information, are stored in advance in the ROM 84 or the storage 88 of the control device 80. In a case in which plural information are conveyed from the information acquiring equipment, the control device 80 compares the degrees of importance thereof, and decides upon the contents to be displayed.

Further, an algorithm that compares respective degrees of importance for each case in which plural information are conveyed to the ROM 84 or the storage 88 may be made into a program. Further, artificial intelligence can be installed in the control device 80, and the appropriate display can be selected.

Moreover, the vehicle occupant can directly designate, to the control device 80, the contents that are to be displayed. For example, in a case in which the vehicle occupant wishes to express thanks to a vehicle therebehind, or in a case in which sudden stoppage of the vehicle is required, or the like, the vehicle occupant can input, to the control device 80, the display portion 92 (the display portion 92A through 92E) that the vehicle occupant wishes to carry out the display and the contents that the vehicle occupant wishes to display. Various methods such as input by a touch panel, voice input, input by selection from among plural choices, and the like can be employed as the method of input.

Figure 6D:
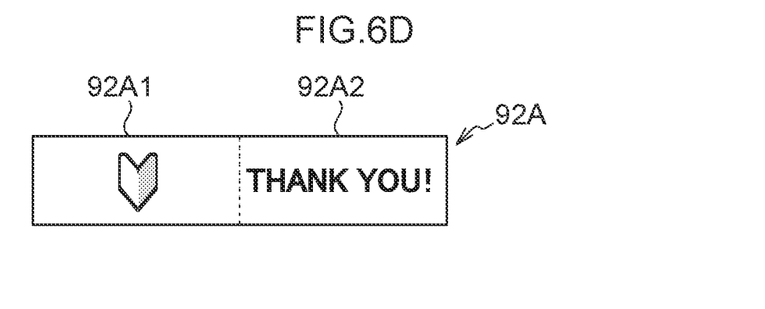
FIG. 6D is a front view showing an example of dividing the display portion of the display device for a vehicle relating to the embodiment of the present disclosure into an automatic display area and an arbitrary display area.

The display portion 92A may be divided into an automatic display area 92A1 and an arbitrary display area 92A2 as shown in FIG. 6D for example, in order for the vehicle occupant to convey desired information at an arbitrary time in this way.

Still further, the control device 80 can decide on times for displaying respective types of information on the display portion 92. For example, in a case in which there are no pedestrians or other vehicles at the periphery of the vehicle 10, the control device 80 can make it such that the information is not displayed on the display portions 92A through 92C. In a case in which information that another vehicle or a pedestrian is approaching is conveyed by the environment information acquiring section 60, the control device 80 causes information to be displayed on the display portions 92A through 92C. In this way, the amount of electric power that is consumed can be reduced by making it such that information is not displayed always.

Display Method

Figure 7:
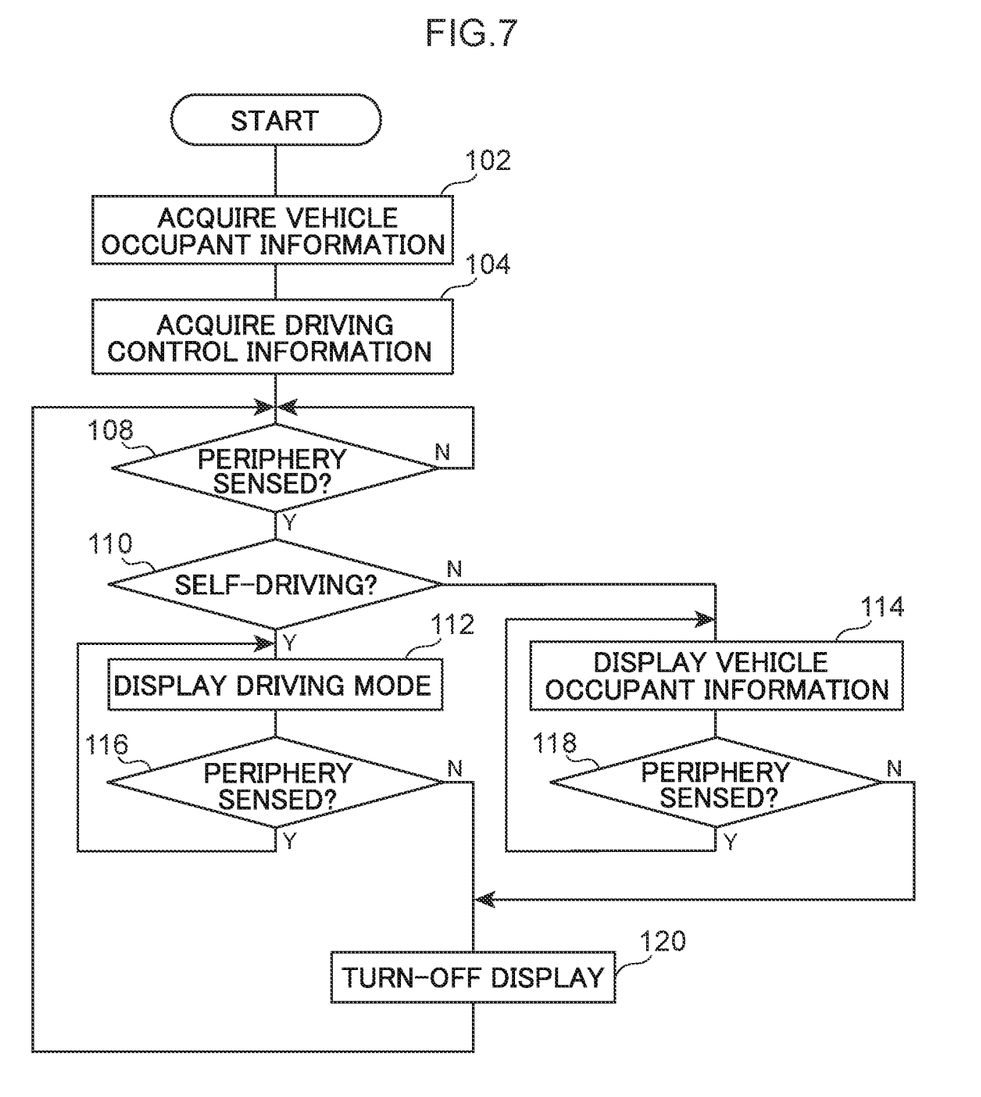
FIG. 7 is a flowchart showing an example of a method of displaying information at the time of traveling of the vehicle in which the display device for a vehicle relating to the embodiment of the present disclosure is installed.

An example of a method of displaying information at the time of traveling of the vehicle 10 in which the vehicle display device 20 is installed, is described by referring to a flowchart shown in FIG. 7. FIG. 7 shows the flowchart as an example of processing, which the CPU 82 of the control device 80 performs by reading and executing (i) the information acquisition program (ii) the deciding program, (iii) the information display program and (iv) the conveying program that are stored in the ROM 84 or the storage 88.

If a vehicle occupant takes a seat in the vehicle 10 that is shown in FIG. 1, the CPU 82 begins the processing shown in FIG. 7

At step 102, the vehicle occupant information acquiring section 50 acquires vehicle occupant information by the CPU 82 that reads and executes the information acquisition program. The acquired vehicle occupant information is conveyed to the control device 80.

After the vehicle occupant sets the driving mode of the vehicle 10 by using the driving setting section 30, at step 104, the set driving mode is conveyed to the driving control information acquiring section 40, and is further conveyed to the control device 80.

In the followings, the processing is explained in a case in which the vehicle 10 starts and keeps travelling.

In next step 108, when the environment information acquiring section 60 senses that another vehicle or a pedestrian or the like has approached the vehicle 10 by the CPU 82 that reads and executes the information acquisition program, the routine moves on to step 110. In the present embodiment, description is given of a case in which, for example, another vehicle has approached at the rear of the vehicle 10.

In step 110, the control device 80 judges, in accordance with the driving mode of the vehicle 10, the contents that are to be displayed on the display portion 92A (see FIG. 2A) by the CPU 82 that reads and executes the deciding program. If the vehicle 10 is in the self-driving mode, the routine moves on to step 112. If the vehicle 10 is not in the self-driving mode and is in the manual driving mode, the routine moves on to step 114.

In step 112, the control device 80 causes information expressing that the vehicle 10 is in the self-driving mode to be displayed on the display portion 92A by the CPU 82 that reads and executes the information display program. Due thereto, drivers of vehicles at the rear of the vehicle 10 can be alerted. For example, even if the driver of a vehicle that is behind sees that the driver of the vehicle 10 is in a posture of having removed his/her hands from the steering wheel, the driver of the vehicle behind can surmise that this is not a dangerous situation. Due thereto, it is easy for the driver of the vehicle behind to remain calm.

Further, in step 116, it is judged whether or not the state of approach of the vehicle behind the vehicle 10 is being maintained by the CPU 82 that reads and executes the information acquisition program. If the approached state is being maintained, the routine returns to step 112, and display is continued. If the approached state is not being maintained, i.e., if the other vehicle no longer exists at the rear of the vehicle 10, the routine moves on to step 120, and the display is turned-off by the CPU 82 that reads and executes the information display program.

In step 114, the control device 80 causes vehicle occupant, information of the vehicle 10 to be displayed on the display portion 92A by the CPU 82 that reads and executes the information display program. Due thereto, the driver of the vehicle behind the vehicle 10 can be alerted. For example, if the driver of the vehicle 10 has little driving experience, the driver of the vehicle behind can address the situation by lowering their traveling speed and widening the distance between the vehicles, or the like.

Next, in step 118, it is judged whether or not the state of approach of the vehicle behind the vehicle 10 is being maintained by the CPU 82 that reads and executes the information acquisition program. If the approached state is being maintained, the routine returns to step 114, and display is continued. If the approached state is not being maintained, i.e., if the other vehicle no longer exists at the rear of the vehicle 10, the routine moves on to step 120, and the display is turned-off by the CPU 82 that reads and executes the information display program.

Note that there are cases in which the driving mode, and the vehicle occupant information that are displayed in steps 112 and 114 respectively are replaced with information that the control device 80 judges to have a relatively high degree of importance by the CPU 82 that reads and executes the deciding program. For example, in a case in which the control device 80 judges, from information from the environment information acquiring section 60, that a vehicle behind is keeping too short of a distance between the vehicles, the control device 80 may display, on the display portion 92A and instead of the driving mode and the vehicle occupant information, words or symbols urging the other driver to leave a greater distance between the vehicles.

Or, in a case in which a child or an animal runs-out in front of the vehicle 10 and sudden braking is carried out, braking information is transmitted from the driving control information acquiring section 40 to the control device 80. In this case, there are cases in which words or symbols warning of a collision are displayed on the display portion 92A toward a vehicle that is behind.

After the display is turned-off in, step 120, the routine returns to step 108, and display is started again when a vehicle behind or a pedestrian again approaches the vehicle 10.

Note that there are cases in which, at the time when the communicating section 70 receives environment information such as accident information the like, or receives vehicle occupant information or the driving mode from a vehicle ahead, that information is displayed on the display portion 92D (see FIG. 3) for example, regardless of the steps that are shown in FIG. 7. The control device 80 judges the degrees of priority of displaying information in cases in which plural information are received. Due thereto, when the vehicle 10 is being driven manually, the vehicle display device 20 can assist the driving of the driver.

In some embodiments, the driving control information acquiring section 40 collect many types of information, including the above-described driving mode, instruction information and state information, as the driving control information. However, embodiments of the present disclosure are not limited to this. In a case in which the vehicle display device 20 is applied to a vehicle having a self-driving function, it suffices for the driving control information acquiring section 40 to be able to acquire at least the "driving mode" of the vehicle 10. In this case, it suffices for the vehicle 10 to have only the display portion 92A (refer to FIG. 2A) as the display portion 92.

Further, in a case in which the vehicle display device 20 is applied to a vehicle that does not have a self-driving function, it suffices for the driving control information acquiring section 40 to be able to acquire at least "state information" relating to the states of the respective parts that physically change in accordance with the driving history, such as the states of wear of the tires, the brake pads and the like, and the elastic modulus of the damper, and the like. In this case, the vehicle 10 can be made to be provided with only with the display portion 92D or the display portion 92E (refer to FIG. 3) as the display portion 92. Namely, it suffices for the display portion 92 to display information toward at least one of the exterior of the vehicle and the interior of the vehicle.

Moreover, the vehicle display device 20 of the present embodiment is equipped with all of the driving setting section 30, the driving control information acquiring section 40, the vehicle occupant, information acquiring section 50, the environment information acquiring section 60, the communicating section 70, the control device 80 and the display section 90. However, embodiments of the present disclosure are not limited to this, and it suffices for the display device for a vehicle to be equipped with at least the driving control information acquiring section 40, the control device 80 and the display section 90.

The driving setting section 30 can be omitted from a vehicle that does not have a self-driving function. Further, in a case in which vehicle occupant information is not to be displayed, the vehicle occupant information acquiring section 50 can be omitted. Moreover, in a case in which the environment information is not to be displayed, the environment information acquiring section 60 can be omitted. Even if the vehicle occupant information and the environment information are not to be displayed, it suffices to be able to display the driving mode to the exterior or the state information to the interior.

Still further, the communicating section 70 can be omitted in cases in which communication is not to be carried out with internet servers or peripheral vehicles. Even if the communicating section 70 is omitted, the driving mode can be displayed on the display portion 92. Further, state information can be displayed on the display portion 92.

In the above exemplary embodiment, the information acquisition processing, the deciding processing, the information display processing and the conveying processing are executed by the CPU 82 that reads software (i.e., programs) which are stored in the ROM 84 or the storage 88. However, the processing of the present disclosure may be executed by various processors other than the CPU 82. Examples of such processors include a Programmable Logic Device (PLD) which circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). The information acquisition processing, the deciding processing, the information display processing and the conveying processing may be executed by a single one of such processors, or may be executed by a combination of two or more processors of the same type or different types (for example, by plural FPGAs, or a combination of the CPU 82 and an FPGA). Specifically, examples of hardware structures of such processors include electric circuits configured by combining circuit elements such as semiconductor devices.

Further, in the above exemplary embodiment, explanation has been given regarding an embodiment in which the information acquisition program, the deciding program, the information display program and the conveying program are installed in advance in the ROM 84 or the storage 88; however, there is no limitation thereto. The programs may be provided in a format recorded on a recording medium such as Compact Disk Read Only Memory (CD-ROM), Digital Versatile Disk Read Only Memory (DVD-ROM), or Universal Serial Bus (USB) memory. Alternatively, these programs may be provided in a format downloaded from an external device through a network. Thus, the present disclosure may be embodied in a variety of embodiments.

What is claimed is:

1. A display device for a vehicle, comprising:
a display section that displays, toward an exterior of the vehicle, driving control information, the driving control information including vehicle occupant information of the vehicle and second information originating at the vehicle and being able to affect a traveling state of the vehicle;
a vehicle occupant information acquiring central processing unit that acquires the vehicle occupant information of the vehicle;
an environment information acquiring central processing unit that acquires environment information of a periphery of the vehicle, the display section displays the environment information; and
a selecting section that selects information having a high degree of importance from among the driving control information, the vehicle occupant information, and the environment information, the display section displays the selected information, and
wherein the selected information is displayed larger than other information among the driving control information, the vehicle occupant information and the environment information.

2. The display device for a vehicle of claim 1, wherein the selecting section judges information, which is new among the driving control information, the vehicle occupant information and the environment information, to be information having a high degree of importance.

3. The display device for a vehicle of claim 1, wherein the selected information is displayed above other information among the driving control information, the vehicle occupant information and the environment information.

* * * * *

UNITED STATES PATENT AND TRADEMARK OFFICE
CERTIFICATE OF CORRECTION

PATENT NO. : 10,744,933 B2
APPLICATION NO. : 16/247962
DATED : August 18, 2020
INVENTOR(S) : Akira Sasaki et al.

Page 1 of 2

It is certified that error appears in the above-identified patent and that said Letters Patent is hereby corrected as shown below:

On the Title Page

Item (72), inventor 1, city, delete "Miyoshi" and insert --Miyoshi-shi, Aichi-ken--, therefor.

Item (72), inventor 2, city, delete "Nagoya" and insert --Nagoya-shi, Aichi-ken--, therefor.

Item (72), inventor 3, city, delete "Okazaki" and insert --Okazaki-shi, Aichi-ken--, therefor.

Item (72), inventor 4, city, delete "Okazaki" and insert --Okazaki-shi, Aichi-ken--, therefor.

Item (72), inventor 5, city, delete "Seto" and insert --Seto-shi, Aichi-ken--, therefor.

Item (58), CPC, delete "B60K 2370/17" and insert --B60K 2370/172--, therefor.

In the Drawings

In drawing sheet 10, figure 8, block 88, delete "STRAGE" and insert --STORAGE--, therefor.

In drawing sheet 10, figure 8, block 40, delete "ACQURIRING" and insert --ACQUIRING--, therefor.

In drawing sheet 10, figure 8, block 50, delete "ACQURIRING" and insert --ACQUIRING--, therefor.

In drawing sheet 10, figure 8, block 60, delete "ACQURIRING" and insert --ACQUIRING--, therefor.

Signed and Sealed this
Fifth Day of January, 2021

Andrei Iancu
*Director of the United States Patent and Trademark Office*

CERTIFICATE OF CORRECTION (continued)
U.S. Pat. No. 10,744,933 B2

In the Specification

In Column 5, Line(s) 11, delete "devices that display" and insert --device that displays--, therefor.

In Column 7, Line(s) 22, delete "sleeping not" and insert --sleeping/not--, therefor.

In Column 8, Line(s) 1, after ""Environment information"", insert --is--.

In Column 8, Line(s) 65 & 66, after "rain or the like", delete ", or the like".

In Column 9, Line(s) 64, delete "tact" and insert --fact--, therefor.